United States Patent [19]

Vriesema et al.

[11] Patent Number: 4,876,327

[45] Date of Patent: Oct. 24, 1989

[54] AROMATIC POLYESTER

[75] Inventors: Bindert K. Vriesema, Sittard, Netherlands; Francesco Miniaci, Genk, Belgium

[73] Assignee: Stamicarbon B.V., Geleen, Netherlands

[21] Appl. No.: 192,626

[22] Filed: May 11, 1988

[30] Foreign Application Priority Data

May 13, 1987 [NL] Netherlands .................. 8701135

[51] Int. Cl.$^4$ ............................... C08G 63/60
[52] U.S. Cl. ................................ 528/173; 528/184; 528/190; 528/191; 528/192; 528/193; 528/194
[58] Field of Search ............... 528/173, 184, 190, 192, 528/193, 194, 191

[56] References Cited

U.S. PATENT DOCUMENTS

| | | | |
|---|---|---|---|
| 3,190,853 | 6/1965 | Watson | 260/47 |
| 3,542,731 | 11/1970 | Culbertson | 260/47 |
| 3,892,768 | 7/1975 | Alvino et al. | 260/326 C |
| 4,039,502 | 8/1977 | Hartzler et al. | 260/30.8 R |
| 4,117,033 | 9/1978 | Gale | 260/860 |
| 4,511,709 | 4/1985 | Yoo et al. | 528/331 |
| 4,710,547 | 12/1987 | Uryu et al. | 525/437 |
| 4,727,129 | 2/1988 | Hisgen et al. | 528/171 |

OTHER PUBLICATIONS

Yasuda et al.—"Synthesis of Polyster by Direct Polycondensation with Triphenylphosphone"—J. Polym. Sci., Polym. Chem. Ed., 1983, 21(9), p. 2610.

*Primary Examiner*—Maurice J. Welsh
*Assistant Examiner*—L. Henderson
*Attorney, Agent, or Firm*—Cushman, Darby & Cushman

[57] ABSTRACT

The invention relates to aromatic polyesters containing units with two carbonyl groups and having liquid crystalline properties. The aromatic polyesters are characterized in that the polyesters contain heterocyclic units with two carbonyl groups. Preferably these units are derived from furandicarboxylic acid. The aromatic polyesters show a considerable reduction in melting temperature, rendering the polyester more processable.

12 Claims, No Drawings

AROMATIC POLYESTER

The invention relates to aromatic polyesters containing units with two carbonyl groups and having liquid crystalline properties.

Aromatic polyesters containing units with two carbonyl groups and having liquid crystalline properties have already been described frequently in patent literature, for example in U.S. Pat. No. 3.884.876; U.S. Pat. No. 3.974.250; GB-A-2.150.580; U.S. Pat. No. 4.067.852; U.S. Pat. No. 4.083.829; U.S. Pat. No. 4.265.802; U.S. Pat. No. 4.146.705; U.S. Pat. No. 4.159.365; U.S. Pat. No. 4.201.856; U.S. Pat. No. 4.299.256. A number of polyesters are already commercially available, for example under the trade names Xydar®, Vecra®. A disadvantage of these polyesters is in many cases the high processing temperature, which may cause, for example, decomposition of the polymer. Another disadvantage is the insufficient availability of standard processing equipment with which the polyesters can be processed at high temperatures. Several solutions have been proposed to improve the processability. In most of these proposals the monomers in the polyester are in part replaced by similar groups substituted with alkyl or halogen. It is also possible to use isomeric monomers. An example of this last group is described in GB-A-2158832. It has now been found that further improvement is obtained by partly replacing the aromatic units with two carbonyl groups by heterocyclic units with two carbonyl groups.

The aromatic polyesters according to the invention are characterized in that the polyesters contain heterocyclic units with two carbonyl groups.

Surprisingly, it has been found that the replacement of only 5% of the aromatic units with two carbonyl groups by heterocyclic units with two carbonyl groups in an aromatic polyester already results in a considerable reduction of the melting temperature, rendering the polyester more processable. This presents the great advantage that the liquid crystalline properties of the polyester is hardly affected.

The invention is extremely effective in the case of aromatic polyesters comprising at least:
(a) units with an oxy-group and a carbonyl group,
(b) units with two oxy-groups,
(c) units with two carbonyl groups.
Examples of such polyesters are given in, for example, EP-A-0118098.

The unit with an oxy-group and a carbonyl group is chosen dependent on the properties of the polyester required. In general, the formula of such a unit is O—R—C=O, in which R contains at least one aromatic ring, for example:

(II)

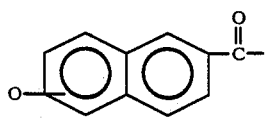

(IIa)

Preferably, the polyester according to the invention contains oxybenzoyl units with formula (II). These units are obtained from hydroxybenzoic acid or from derivatives thereof. The oxybenzoyl unit like (II) may be para- or meta-substituted. Mixtures of para- and meta-substituted oxybenzoyl units with formula (II) may also be used. Preferably, the unit like (II) is para-substituted. One or more of the hydrogen atoms in the aromatic ring may be substituted by an alkyl or alkoxy group, with one to four carbon atoms, by a halogen such as chlorine, bromine and fluorine and/or by a phenyl group which may be substituted if so desired. More preferably, the oxybenzoyl unit is derived from p-hydroxybenzoic acid. The polyester preferably contains 20-70 mol% oxybenzoyl units.

The formula of units with two oxy-groups is usually O—R—O, with R containing at least one aromatic ring, for example:

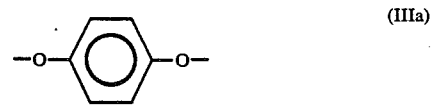
(IIIa)

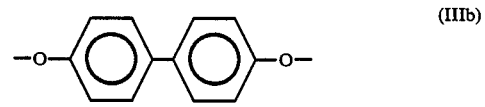
(IIIb)

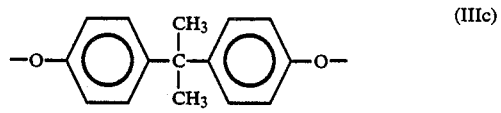
(IIIc)

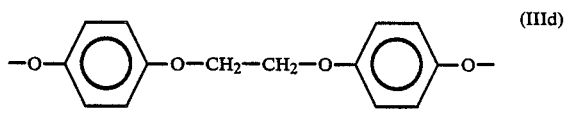
(IIId)

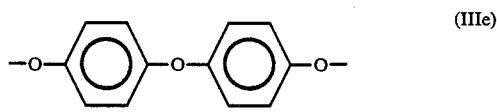
(IIIe)

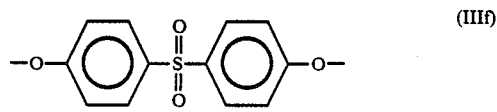
(IIIf)

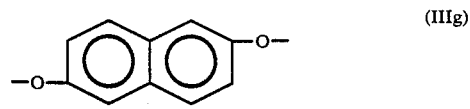
(IIIg)

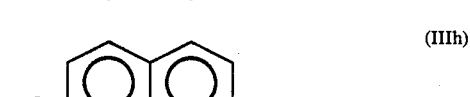
(IIIh)

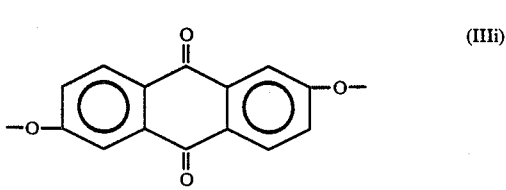
(IIIi)

The polyester according to the invention may also contain mixtures of the aforementioned units. Preferably the polyester according to the invention contains dioxyphenyl (IIIa) and/or biphenoxy (IIIb) groups, more particularly a biphenoxy group with formula (IIIb). The last compound can be obtained from p,p'-biphenol. In the aromatic rings one or more hydrogen atoms may be substituted by an alkyl and/or alkoxy group, a halogen and/or a phenyl group, which may in its turn be substituted. Preferbly, the polyester contains 5-50 mol% units with two oxy-groups.

The polyester according to the invention contains 5-50 mol% units with two carbonyl groups, of which 1-80 mol%, preferably 5-50 mol%, are heterocyclic. A heterocyclic unit with two carbonyl groups can be obtained from dicarboxylic acids and esters thereof, for example 3,5-pyridinedicarboxylic acid, 3,6-pyridinedicarboxylic acid, 2,5-pyridinedicarboxylic acid, 2,4-pyrroledicarboxylic acid, 2,4-thiophenedicarboxylic acid, 2,5-thiophenedicarboxylic acid, 2,5-pyrazinedicarboxylic acid, 2,3 pyrazinedicarboxylic acid, furandicarboxylic acid. Preferably the heterocyclic unit with two carbonyl groups is obtained from furan-dicarboxylic acid so that a unit with two carbonyl groups like (V) is obtained:

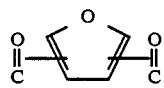 (V)

This component can be obtained from 2,5 furandicarboxylic acid, 2,4-furandicarboxylic acid, 2,3-furandicarboxylic acid or from the derivatives of these acids. Preferably 2,5-furandicarboxylic acid or a corresponding ester is used as the starting substance. The furandicarboxylic acid can be synthesized in known manner as described for example in 'Delft Progress Reports', (1974), A, 59-63, by P. M. Heertjes and G. J. Kok.

The aromatic units with two carbonyl groups can be obtained from aromatic dicarboxylic acids or from the corresponding esters, for example terephthalic acid, isophthalic acid, 2,6-naphthalenedicarboxylic acid, 2.7-naphthalenedicarboxylic acid, bibenzoic acid, 4,4'-dicarboxylicdiphenylsulfon, 4,4'-dicarboxylicdiphenylethane, 4,4'-dicarboxylicdiphenylsulfide, 4,4'-dicarboxylicdiphenylether, 4,4'-dicarboxylicdiphenylmethane, 4,4'-dicarboxylicdiphenoxyethane, 2,2-bis(4-carboxyphenyl)propane. Preferably the aromatic units with two carbonyl groups are obtained from terephthalic acid, isophthalic acid and/or the corresponding derivatives thereof. One or more hydrogen atoms in the aromatic ring may be substituted by an alkyl and.or alkoxy group, a halogen and/or a phenyl group, which phenyl group may in its turn be substituted. Preferably the units with two carbonyl groups are obtained from unsubstituted terephthalic acid and/or isophthalic acid.

Depending on the properties desired, the polyester may also comprise amine-containing units, which results in a polyester amide.

The amine-containing unit may be obtained, for example, from known substances, such as p-aminobenzoic acid, p-aminophenol, p-N-methylaminophenol, p-phenylenediamine, N-methyl-p-phenylenediamine, N,N'-dimethyl-p-phenylenediamine, m-aminophenol, 4-amino-1-naphthol, 4-amino-4'-hydoxydiphenyl, 4-amino-4'-hydroxyphenyl ether, 4-amino-4'-hydroxydiphenylmethane, 4-amino-4'-hydroxydiphenylethane, 4-amino-4'-hydroxydiphenyl sulphone, 4-amino-4'-hydroxydiphenyl sulphide, 4,4'-diaminophenyl sulphide, 4,4'-diaminodiphenyl sulphone, 2,5-diaminotoluene, 4,4'-ethylenediamine, 4,4'-diaminodiphenoxyethane, 4,4'-diaminodiphenylmethane, 4,4'-diaminodiphenyl ether.

The polyester may, if required, also contain carbonate units as stated in, for instance, the American patent U.S. Pat. No. 4.371.660.

The polyester according to the invention can be prepared in a process known per se, for example via condensation or esterification of the reactive derivatives of the components to be used. The process to be used depends on the polyester to be synthesized. Preferably a condensation reaction is applied; the reaction of the monomers takes place between 50° C. and 350° C., preferably in an inert atmosphere such as nitrogen or argon, followed by a polycondensation reaction, at increased temperature and reduced pressure, which results in a polycondensate with the desired degree of polymerization. It is possible, but not absolutely essential, to effect the condensation or esterification and the polycondensation reaction in the presence of a catalyst, for example Lewis acids and hydrohalic acids; organic or inorganic acids, complexes or mixed salts of alkali metals or alkaline earth metals, for example magnesium and calcium; of Secondary Group elements, for example vanadium, manganese, cobalt, titanium, zinc, nickel, lanthanum, cerium, zirconium or of elements such as germanium, tin, lead and antimony, or the alkali and alkaline earth metals themselves, such as sodium, sodium hydroxide, lithium acetate, sodium acetate, potassium acetate, calcium acetate, magnesium acetate, cobalt acetate, zinc acetate, calcium benzoate, magnesium acetylacetonate, zinc acetylacetonate, vanadium-alkoxides, titanium alkoxides, such as titanium tetrabutylate, titanium tetrapropylate, alkoxy titanium silicates, zirconium butylate, zirconium propylate, titanium phenolate, sodium phenolate, germanium dioxide, antimony dioxide, dialkyl and diaryl tin oxide, dibutyltin diacetate, and dibutyldimethoxytin. Magnesium, manganese, sodium, potassium and/or zinc acetates are preferred. The catalysts is added in amounts up to 1 wt%, with respect to the total weight of the monomers used.

Once the reaction rate of the condensation or esterification has decreased, the polymerization mixture is, if so desired, maintained under vacuum (±0.1 mbar) at increased tempertue for one or more hours. The product obtained is ground after having been cooled. Preferably the ground product is post-condensed for 5-30 hours at a temperature of 200°-400° C.

The polyesters according to the invention can be processed excellently from the melt, since the processing temperature of the polyesters lies well below the decomposition temperature of the polyesters. Suitable processing techniques are, for instance, injection moulding and extrusion.

Objects manufactured partly or entirely from the polyesters according to the invention have good properties with respect to tensile strength, chemical and heat resistance. Because of this, objects manufactured from the polyesters are applied particularly in the electrotechnical industry, aircraft industry and automotive industry.

The polyesters according to the invention are particularly suitable for the production of films and fibres, in which especially the strength of the film or fibre plays an important part. Films or fibres manufactured from the polyesters according to the invention are therefore extremely suitable for application in the textile and packing industry. Dependent on the application, fillers, for example glass fibres, may, if so desired, also be added to the polyesters, preferably to at most 60 wt%.

The invention will be further elucidated with the following examples.

EXAMPLE 1

Preparation of a polyesteramide from p-hydroxybenzoic acid, 2,6-dihydroxyanthraquinone, isophthalic acid, terephthalic acid, p-phenylenediamine and 2,5-furandicarboxylic acid in a molar ratio of (60, 15, 5, 10, 5, 5).

A three-neck flask (500 ml) to which a gas inlet tube, a condenser and a distillation unit had been connected, was filled with 54.05 g (0.3 mol) of 4-acetoxybenzoic acid; 24.32 (0.075 mol) of 2,6 dihydroxyanthraquinone diacetate; 8.24 g (0.05 mol) of terephthalic acid; 4.12 g (0.025 mol) of isophthalic acid; 4.81 g (0.025 mol) of N,N'-1,4-phenylbisacetamide and 3.8 g (0.025 mol) of 2,5-furandicarboxylic acid.

Nitrogen was passed over the mixture. The flask was heated to 250° C., which caused the contents to melt and started the polymerization. The temperature was slowly raised to 320° C. and the mixture was maintained at that temperature (for about 1 hour) and subsequently brought under vacuum (0.1 mbar) for about 1 hour.

Once the polymer obtained had cooled to room temperature, it was ground, post-condensed (for 24 hours, at 240° C.) and characterized with the help of Differential Scanning Calorimetry (DSC). Melting temperature (Tm)=300° C.

EXAMPLES 2-5 AND COMPARATIVE EXAMPLES A AND B

A reactor as used in example 1, with a stirrer, was filed with:
a. terephthalic acid (TPA)
b. biphenol diacetoxy (BP diAc)
c. p-acetoxybenzoic acid (pAc-BA)
d. 2,5-furandicarboxylic acid (FDA)
e. isophthalic acid (IPA)

The reactor is purged under nitrogen and kept under nitrogen throughout the procedure. The mixture is refluxed for three hours at 150° C. In a further three hours the temperature is raised to 290° C. During this time acetic acid and excess acetic anhydride is distilled. The resulting prepolymer is ground after cooling. The prepolymer powder is heated in a solid state postcondensation apparatus under a nitrogen atmosphere. In this step the temperature is raised from room temperature to 260° C. in twelve hours. Table 1 gives the results and the components used.

TABLE 1

(The figures placed between brackets refer to the number of mmoles.

| Ex. | TA | FDA | BPdiAc | pAcBA | IPA Tm⊓C | DSC |
|---|---|---|---|---|---|---|
| A | 6.64 g (40) | — | 10.81 g (40) | 14.41 g (80) | — | 415 |
| 2 | 6.31 g (38) | 0.31 g (2) | " | " | — | 390 |
| 3 | 5.31 g (32) | 1.25 g (8) | " | " | — | 364 |
| 4 | 4.98 g (30) | 1.56 g (10) | " | " | — | 356 |
| 5 | 3.32 g (20) | 3.12 g (20) | " | " | — | 340 |
| B | 6.21 g (38) | — | " | " | 0.33 (2) | 400 |

In examples 2, 3, 4 and 5 the FDA fraction amounted to respectively 5 mol%, 20 mol%, 25 mol% and 50 mol%, of the total amount of dicarboxylic acid.

The examples showed that when FDA is added, the Tm is considerably lower than when TA is replaced by the same amount of IPA.

EXAMPLE 6 AND COMPARATIVE EXAMPLE C

The same procedure as was employed in examples 2-5 was followed but now the following components were used:
a. 580,1 g p-acetoxybenzoic: (4.2 mol)
b. 154,2 g hydroquinine: (1.4 mol)
c. 151,3 g 2.6-naphtalenedicrboxylic adic: (0.7 mol)
d. 83,1 g naphtalic acid: (0.5 mol)
e. 31,2 g 2,5-furandicarboxylic acid: (0.2 mol)

The molar ratio thus obtained amounted to (60;20;10;7:3) $T_m=303°$ C.

Comparitive example C, with the same components as example 6, but no 2,5-furandicarboxylic acid present, molar ratio obtained (60;20;10;10), resulted in a $T_m=311°$ C.

We claim:
1. An aromatic polyester having liquid crystalline properties and a reduced melting temperature, characterized in that the polyester comprises (1) repeating aromatic units having at least one oxo group in the polymer chain linkage, said aromatic units containing at least one aromatic ring consisting of carbon atoms, and (2) repeating heterocyclic units, said heterocyclic units having two carbonyl groups and being linked to said aromatic units through a carboxylic ester linkage, and said heterocyclic units being derived from pyridine, pyrrole, thiophene or furan dicarboxylic acids and esters thereof.

2. Polyester according to claim 1, characterized in that the polyester comprises
(a) 20-70 mol% of oxybenzoyl units with formula (II)

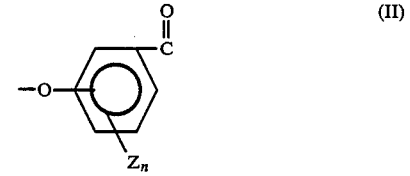

in which Z=an alkyl or alkoxy group with at most 4 C-atoms or a halogen, or a phenyl group, which may in its turn be substituted, with n<0, 1, 2, 3 or 4;

(b) 5-50 mol% of dioxy units with formula (III)

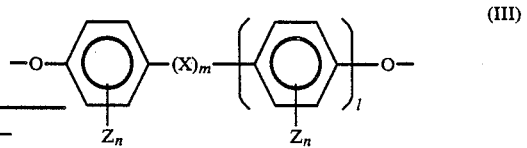

in which Z=an alkyl or alkoxy group with at most 4 C-atoms, or a halogen, or a phenyl group, which may in its turn be substituted,
with n=0, 1, 2, 3, 4
with m, l=0 or 1
with X being —C)CH$_3$)$_2$—, OC$_2$H$_4$0, —O—, —SO$_2$—, —CH$_2$—, —CO— or —S—;
(c) 5–50 mol% of a combination of
1. 1–80 mol% of heterocyclic units with a formula

with R being a pyridine, pyrrole, thiophene, or furan radical
2. 99–20 mol% of units with two carbonyl groups with formula (IV)

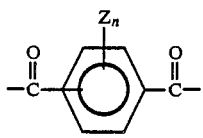 (IV)

with Z being an alkyl or an alkoxy group with at most 4 C-atoms; or a halogen; or a phenyl group which may in its turn be substituted; n=0, 1, 2, 3 or 4.

3. Polyester according to claim 2, characterized in that component (c) is a combination of 51–50 mol% of the heterocyclic units with two carbonyl groups and 90–30 mol% of the group with formula (IV).

4. Polyester according to claim 1, characterized in that the heterocyclic unit with two carbonyl groups is a furandicarbonyl group.

5. Polyester according to claim 1, characterized in that the heterocyclic unit with two carbonyl groups in chosen from 2,5-furandicarbonyl, 2,4-furandicarbonyl and 3,4-furandicarbonyl.

6. Polyester according to claim 1, characterized in that the heterocyclic unit with two carbonyl groups is 2,5 furandicarbonyl.

7. Polyester according to claim 2, characterized in that component (a) contains at least a p-oxybenzoyl unit.

8. Polyester according to claim 2, characterized in that component (b) contains at least a p,p'-biphenoxy unit.

9. Polyester according to claim 2, characterized in that component (c.2) contains at least a terephthaloyl and/or isophthaloyl unit.

10. Object, manufactured entirely or partially from the melt from a polyester according to claim 1.

11. Fibre, spun entirely or partially from the melt from a polyester accordingg to claim 1.

12. Film, manufactured entirely or partially from the melt from a polyester according to any one of claims 1–9.

* * * * *